FIG. 4

FLOW-SHEET OF SEQUENCE OF STEPS WHICH MAY BE FOLLOWED TO PRODUCE A DECORATIVE LAMINATE HAVING A COMPOUND CURVED CONTOUR

STEP 1-A
FOAMING A PLASTIC MATERIAL BETWEEN TWO WEBS OF PAPER AND CUTTING LAMINATE INTO SHEETS ("A" OF FIG. 3)

STEP 1-B
EXTRUDING A THERMOPLASTIC RESIN BETWEEN TWO WEBS OF PAPER ONE OF WHICH HAS A DECORATIVE OUTER SURFACE AND CUTTING LAMINATE INTO SHEET ("B" OF FIG. 3)

STEP 2
ADHERING LAMINATES A AND B BY AN ADHESIVE FILM

STEP 3
DUPLEX SCORING OF THE LAMINATE

STEP 4
TRIMMING LAMINATE TO DESIRED PERIPHERY

STEP 5
WETTING BACK OF LAMINATE WITH A VOLATILE ORGANIC SOLVENT FOR FOAMED PLASTIC

STEP 6
PERMITTING BACK SURFACE OF LAMINATE TO BECOME SUPERFICIALLY FREE OF ORGANIC SOLVENT

STEP 7
VACUUM FORMING LAMINATE OF A COMPOUND-CURVED CONTOUR

STEP 8
FREEING LAMINATE OF RESIDUAL ORGANIC SOLVENT

INVENTORS
HERMAN F. BOCK
ROBERT C. GRAHAM, DECEASED
BY WINIFRED GRAHAM, EXECUTRIX
JAY J. UBER
BY
Cleveland B. Hollabaugh
ATTORNEY April 21, 1970     H. F. BOCK ET AL     3,507,728
METHOD FOR PRODUCING A DECORATIVE LAMINATED PANEL INVENTORS
HERMAN F. BOCK
ROBERT C. GRAHAM, DECEASED
BY WINIFRED GRAHAM, EXECUTRIX
JAY J. UBER
BY Cleveland B. Hollabaugh
ATTORNEY April 21, 1970    H. F. BOCK ET AL    3,507,728
METHOD FOR PRODUCING A DECORATIVE LAMINATED PANEL
Original Filed Feb. 15, 1963    6 Sheets-Sheet 5

INVENTORS
HERMAN F. BOCK
ROBERT C. GRAHAM, DECEASED
BY WINIFRED GRAHAM, EXECUTRIX
JAY J. UBER
BY

Cleveland B. Hollabaugh

ATTORNEY

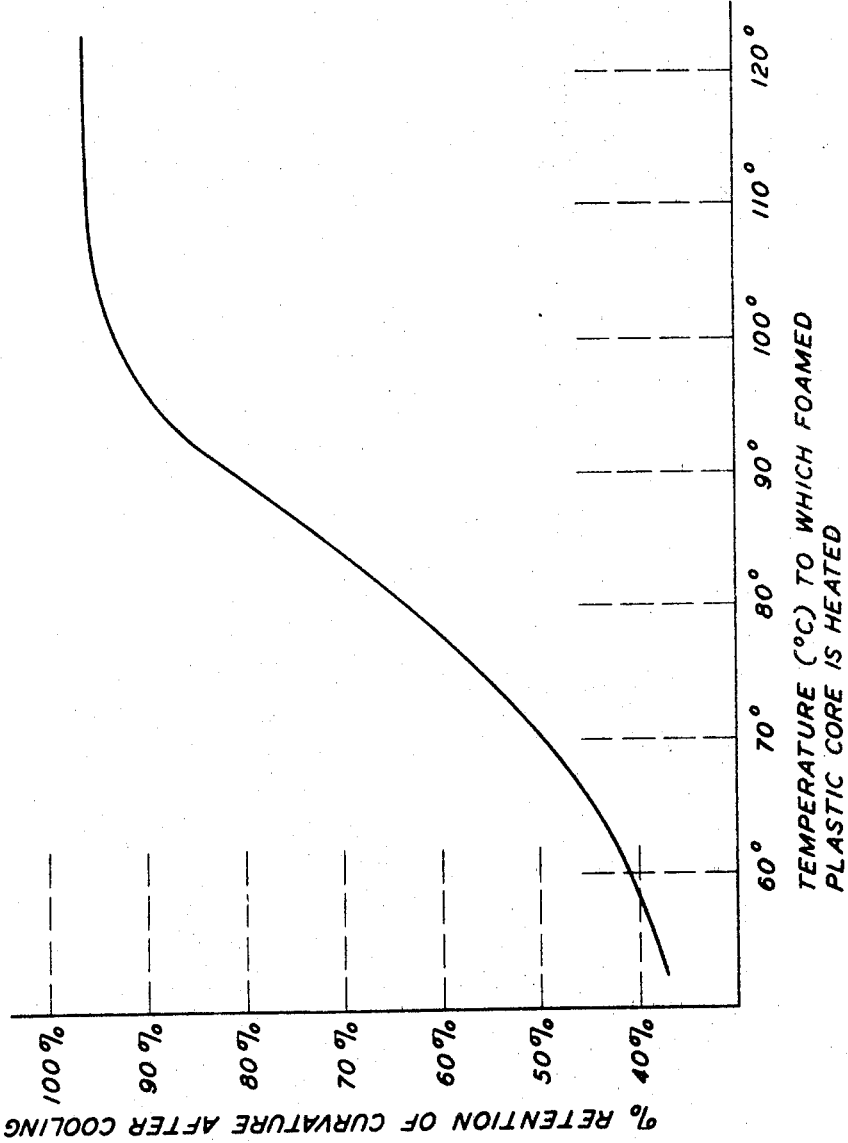

3,507,728
METHOD FOR PRODUCING A DECORATIVE LAMINATED PANEL
Herman F. Bock, South Hadley, Mass., Robert C. Graham, deceased, late of South Hadley, Mass., by Winifred Graham, executrix, South Hadley, Mass., and Jay J. Uber, South Hadley, Mass., assignors to The Plastic Coating Corporation
Original application Feb. 15, 1963, Ser. No. 258,857. Divided and this application Dec. 11, 1964, Ser. No. 417,838
Int. Cl. B32b *31/14*
U.S. Cl. 156—196           9 Claims

ABSTRACT OF THE DISCLOSURE

A method is disclosed for making a composite, decorative, laminated panel having a predetermined peripheral shape and one or more compound curves. Such panels are used as interior trim in motor vehicles, and the invention is especially suited for making one piece headliners for automobiles. In the method, a plastic material is foamed between two webs of paper and the resulting laminate is cut into sheets. Two additional paper webs are formed into a laminate by extruding a thermoplastic resin between them. These two laminates are adhered together by an adhesive film. The resulting composite laminate is then scored on each outer surface thereof with two sets of parallel score lines to form a grid pattern, the score lines on one surface being offset from those on the other surface. The composite laminate is trimmed to the desired periphery. One outside surface of the composite laminate is wet with a volatile organic solvent for the foamed plastic, which solvent is permitted to penetrate the surface of the laminate and to evaporate substantially completely from the outer surface of the composite laminate. The composite laminate is then vacuum formed into the desired compounded curvature after which residual organic solvent is removed.

---

This application is a division of U.S. patent application Ser. No. 258,857, filed Feb. 15, 1963, entitled Decorative Laminated Panel.

This invention relates to a method for the production of a composite, decorative, laminated panel and more particularly to a method for the production of a composite, decorative, laminated panel which has a predetermined, peripheral shape and surfaces which carry one or more compound curves. This decorative, laminated panel is suitable for use as the interior trim of motor vehicles and is especially suitable for use as a unitary, one-piece lining for the tops of various types of motor vehicles.

Decorative, laminated, paperboard panels have come into widespread use as the interior lining of motor vehicles. Much progress has been made in producing such panels which are pleasing in appearance, which are dimensionally stable to changes in atmospheric humidity, and which are resistant to water and can be readily cleaned by the use of a damp cloth. However, these panels have left much to be desired due to the difficulty involved in forming them into compound curved sections and, consequently, have been limited to relatively small sizes.

Although widely used as the interior linings of the tops of motor vehicles, which are usually termed "headliners," each such liner has heretofore been made up of a plurality of panels extending across the vehicle. This construction has required the use of lateral metal strips, plastic strips or other suspension or decorative devices, extending across the headliner to cover the adjacent edges of the panels. The cross-strips are objectionable from an aesthetic standpoint, and materially increase the cost of the headliner. The increase in cost involved arises from the cost of the strips required, as well as from the time required and the labor involved in their installation. The time required for the installation of such headliners is a factor of considerable importance in the production line assembly of automobiles.

It is an object of this invention to provide a method for the production of a decorative, laminated panel which is compound curved in contour, which is adapted for use as interior trim for vehicles and, particularly, for use as one-piece or unitary headliners for automobiles, truck cabs, buses and other types of vehicles, without the use of lateral cross-strips.

Another object is to provide a method for the production of a laminated panel which is compound curved in contour, which provides thermal insulation, has a cushioning action which provides a safety factor when used as the interior lining of a motor vehicle, and which has a decorative surface which is readily cleaned by the use of a damp cloth.

A further object is to provide a method for the production of a decorative, unitary headliner for an automotive vehicle, which snaps into position in the automobile body and can be installed in a matter of seconds on a production line, which is under stress when in position in the top of the automobile and which conforms closely to the contour of the metal top of the automobile, leaving little or no dead space between the top of the automobile and the headliner, thereby providing maximal headroom within the automobile.

A still further object of this invention is to provide a method for the production of decorative, laminated panels having compound curved contours, which is adapted for their efficient commercial manufacture in large volume.

Other objects of this invention, and its various advantageous features, will become apparent from the detailed description which follows.

The decorative, laminated panel produced by the method in accordance with this invention is a composite sheet having a peripheral shape and dimensions and a compound curved contour, each of which is accurately predetermined in view of the intended use of the panel. This panel comprises, essentially, a core consisting of a layer or sheet of a foamed plastic material of uniform thickness which is compressible without rupture, which has the compound curved contour of the panel, and a sheet material adhered to each of its surfaces which accurately follows the compound curvature of the core without wrinkles or folds. The foamed plastic core of this panel is flexible, but has an elastic memory which causes the panel to return to its original compound curvature after reasonable distortion thereof. This flexibility, and its ability to return to its original contour, is an important feature of the panel since it permits the distortion of the panel during installation, followed by its return to its original compound curvature.

One of the sheets on the outer surface of this decorative, laminated panel has a decorated, outer surface which will be referred to as the "face" of the panel. The reverse surface of this laminated panel, which is usually not decorated, will be referred to as the "back" of the panel. Both of the outer surfaces of the panel carry two sets of grooves or score lines. The score lines of each set are parallel to each other, and the score lines of the two sets are positioned at right angles to each other. The sets of parallel score lines on the opposite sides of the panel are in alternating positions, such that each score line on one side of the panel is directly opposite a line on the opposite side of the panel, approximately midway between and parallel to adjacent score lines on that side of the panel. The score lines on the decorative face of the panel form a feature of the decoration of the surface. The decorated face of the panel may be either convex or concave, or partially convex and partially concave, and may include substantially flat areas, depending upon the intended use of the panel.

The parallel grooves or scores on the surfaces of this decorative panel may be located only in the areas of the panel which are curved. However, both from the standpoint of the appearance of the decorative side of the panel and from the standpoint of efficiency in its manufacture, it is preferable to extend each score entirely across the panel. The spacing between the two sets of equally spaced, parallel score lines on each surface of the panel may be the same, producing square areas between the scores, resulting in an overall square waffle pattern. Again, the spacing between the sets of equally spaced, parallel scores on each surface may be different, producing rectangular areas between the scores, resulting in an overall rectangular waffle pattern. Alternatively, other score lines may be located to form other geometric patterns, such as one producing areas between the score lines which are parallelograms.

The relative positions of the parallel sets of scores on the opposite side of the laminate are important to the avoidance of the formation of unsightly folds, creases or puckers in the molding of the panel to a compound curved contour. The parallel scores are preferably offset on opposite sides of the laminate by one-half of the distance between the parallel scores, although some deviation is permissible. The deviation from the exact mid-point which is permissible depends upon the spacing between the adjacent score lines. In the case of score lines spaced at intervals of one-half inch, the deviation from the exact mid-point cannot exceed more than 20% of the distance from the mid-point between the two parallel score lines and either of the two adjacent score lines, without creating a tendency to an undesirable wrinkling, folding, or buckling of the panel during its production.

The paper sheet which is adhered to the back of the foamed core of the panel, forming its back undecorated surface, may be impregnated and/or coated with a film of a film-forming material, to render it moisture and water-resistant. It is, preferably, both impregnated and coated on its outer surface with an organic, film-forming material which is soluble in a volatile, organic solvent, which is also a solvent or softening agent for the foamed plastic material which forms the core of the panel.

The sheet material which is adhered to the face surface of the foamed plastic core to produce this decorated laminated panel may be a single sheet of paper, or a plastic film, or of a woven or felted textile fabric which has a decorative outer surface which forms the face of the panel. Alternatively, this sheet material may be a laminate of a sheet of paper adhered to a second sheet of paper, or of plastic film, or of a woven or felted textile fabric which has a decorative outer surface, by a film or layer of a waterproof adhesive. Again, it may be a laminate of a sheet of paper adhered to a second sheet of paper by a film or layer of adhesive, the outer surface of which is, in turn, adhered to a third sheet of paper which has a decorated outer surface, by a layer of a thermoplastic resin such as, for example, polyethylene or polypropylene.

The decorated, laminated panel produced by the method in accordance with this invention is particularly suitable for use as a one-piece or unitary headliner for an automobile. This headliner is formed with the decorated face of the panel on its concave side of its compound curvature. This compound concave curvature is substantially identical with that of the inside of the top of the automobile. Such a headliner may be snapped into position with its lengthwise edges positioned in metal or plastic channels along the inside edges of the top. The front edge of the headliner may be held in place by positioning it under the upper edge of the metal or plastic trim which is usually used around the inside edge of the windshield of the vehicle. The back, or rearwardly edge, of the headliner may be similarly held in place by positioning it under the upper edge of the metal or plastic trim around the rear window of the vehicle.

This decorative, laminated panel forms a particularly advantageous headliner for an automobile from several standpoints. It eliminates the unsightly cross-strips which have heretofore been used in the fabrication of headliners. Its installation and removal are considerably less time-consuming than the multiple-segment prior art headliners. It does not sag in use, since it is domed upwardly and is under tension when in place in the automobile. The foamed plastic core is resilient and tends to cushion shock in the case of an accident. Further, the plastic foamed core acts as thermal insulation which tends to keep the interior of the automobile cool in summer and warm in winter. The compound curvature of the headliner follows closely that of the top of the automobile and fits snugly in position, eliminating dead space and increasing the available headroom within the automobile.

The foamed plastic which is used as the core of this decorated, laminated panel is a plastic which contains many thousands of closed gas cells per cubic centimeter. It is of the type which has come to be known as "rigid foam," in contrast to the so-called "flexible foam." This rigid foamed plastic is one which is softened by a properly selected, volatile, organic solvent, and preferably, by a volatile, organic solvent which is noninflammable. It is in the form of a sheet which may have a thickness within the range of about $1/16$ of an inch to about $1/8$ of an inch. Foamed polystyrene is presently preferred for forming the foamed plastic layer because of its low cost and the ease with which it may be foamed into the desired compressible, somewhat soft product, having great numbers of fine cells, yet it will be understood that various other plastics may be used. Polyvinyl chloride resin, polyurethane resin, polyester resin, urea-formaldehyde resin, and the like, may be used. The plastic used as the foamed core of the laminate must be selected in view of the alternative which is to be used in imposing the compound curvature in forming the panel. In the alternative in which a volatile solvent is used, the plastic of the foamed core should be one that is readily softened by the use of a volatile solvent. In the alternative in which the laminate is given a compound curvature by the use of heat, the plastic of the foamed core should be thermoplastic in nature. We have found that a foamed polystyrene core is readily deformed by either of these methods, after deformation to a compound curvature, and has a high percentage retention of the compound curvature.

It is convenient to produce this foamed plastic core as a base laminate between two sheets of paper or two sheets of plastic film or between a sheet of paper and a sheet of plastic film, by the foaming of a suitable plastic while in direct contact with the sheets. The sheet which is on the back of the foamed core in the final laminate must be permeable to an organic solvent. Paper is entirely suitable for this purpose. The sheet which is on the face side of the foamed plastic core in the final laminate need not be solvent permeable. The sheets between which this foamed plastic core are produced then form what has been referred to as the "sheet material" on the surfaces of the foamed plastic core or the inner layers of a "sheet material" which are laminates of those sheets and one or more additional sheets.

In producing the paper and foamed plastic sandwich which may be used as a base or core laminate in one of the alternative ways in which this decorative laminate may be produced utilizing, for example, polystyrene, it is convenient to use as starting materials fine spherical beads, granules, or a thin sheet of polystyrene, having distributed therein a suitable heat-sensitive foaming agent, which may be of various known forms and which, when the composition is heated and softened, will cause fine gas bubbles to form therein with the consequent expansion of the material into the form of the desired foamed plastic layer. Such polystyrene, before being expanded, will have a density of about 65.6 lbs. per cubic foot. If the polystyrene mixture containing the catalyst or foaming agent is heated and allowed to expand only to several times its original volume, the resulting foamed product will ordinarily have too great a density and will be too hard for use in accordance with this invention. On the other hand, if the expansion is carried too far, the gas bubbles formed therein may, and usually do, become too large, and the resulting foamed product when cooled will tend to be brittle and crack when pressure is applied thereto.

The number of fine cells in the plastic is, of course, related to the degree to which the material is expanded, in other words, its density. In a typical preferred foamed core of this decorative, laminated panel, the foamed core had a density approximating 3 pounds per cubic foot and had about 150,000 fine closed cells per cubic centimeter of the expanded material. With material expanded to lesser densities, the number of cells may decrease to about 50,000 per cubic centimeter as a minimum, whereas with higher densities, for example, 10 pounds per cubic foot, the number may be as high as 1,000,000 per cubic centimeter.

If the styrene containing the foaming agent is initially supplied in sheet form, a particularly convenient form for the purpose, such a sheet may simply be placed between two of the kraft sheets or other suitable paper sheets and heated while located between two spaced plates, for example, which contain a fluid heating medium and through which, thereafter, cooling fluid may be passed to chill the assembly to stop the foaming action at the desired point. If the heating and foaming takes place in the polystyrene under some pressure against heated kraft sheets, the laminated sheets adhere together without interposing any adhesive material. However, in some cases, the use of adhesive has been found desirable. Water mixtures of latex type adhesives or various formaldehyde resin adhesives which are nonsolvents for polystyrene are suitable for this purpose.

The appropriate times and temperatures for producing the desired foaming action may be readily determined by trial and will usually depend upon the particular foaming agent incorporated in the polystyrene.

The foamed plastic core of the blank from which this decorated panel is produced is relatively stiff. Similarly, a base laminate produced as described herein is also stiff. Neither can be wound into rolls, and must be cut into sheets as they are produced. These sheets should be of a size somewhat larger than the size of the panel which is being produced. For this reason, it is usually convenient to prepare separate laminates for the face of the panel blank if the sheet material on the face is to consist of three or more laminated sheets which is preferred for many uses. Such preparation of a facing lamination is desirable, since it is flexible and can be wound into rolls and, hence, can be prepared at relatively high speeds. This laminate is then cut into sections of suitable sizes and then adhered to the stiff, foamed plastic core or to the stiff base laminate in which the foamed plastic core is between two other sheets.

The facing laminate which may be used as an intermediate unit in the fabrication of this decorative, laminated panel may, for example, consist of a sheet of well-sized kraft paper having a basic weight within the range of about 20 pounds to about 40 pounds adhered by a layer of thermoplastic resin to a sheet of well-sized bleached kraft or book paper having a basic weight within the range of about 50 pounds to about 80 pounds. This sheet of bleached kraft or book paper may be impregnated with rubber or a synthetic latex to render it scuff-resistant. It has an outer surface decorated by printing or embossing or by a combination of both. This decoration may be applied before the sheet is laminated, or may be applied to its surface after it becomes a part of the facing lamination. The surface of this sheet which is decorated may also carry a lacquer coating to improve its decorative qualities and its resistance to water. The thermoplastic resin between the sheets of this facing laminate may be polyethylene, polypropylene or any one of many other flexible, waterproof, thermoplastic resins, and should be at least 0.75 thousandth of an inch thick and may be as thick as 1.5 thousandths of an inch.

The facing laminate may be produced by continuously extruding the thermoplastic resins between two continuously-moving webs of paper. In this operation, the thermoplastic resin is heated to a temperature within its softening range, and forced under pressure through a long, narrow nozzle, the length of which approximates the widths of the webs of paper. The two moving webs of paper are brought into close proximity to each other and the soft, semi-liquid sheet of the thermoplastic resin continuously deposited between and in contact with their adjacent surfaces, to adhere the two sheets together. In the preferred procedure in which the sheet which is to form the face surface of the lamination has been decorated before lamination, its reverse or undecorated surface is brought into contact with the thermoplastic resin. In the alternative procedure, the outer surface of this sheet is decorated after lamination, as already noted hereinbefore. In either alternative, the decoration of the surface of the face sheet may be by printing, embossing, lacquer coating or any combination thereof.

In both the base laminate and the facing laminate, the internal layer of plastic or resin, as the case may be, usually functions as its own adhesive. The facing laminate is adhered to the base laminate by any one of the adhesives widely used in the paper industry, which are applied as aqueous solutions, but which become water-insoluble upon the evaporation of their water content. As noted elsewhere herein, a correlation of the timing of the scoring of the final laminate blank with the setting of this adhesive is advantageous. The aqueous adhesive used for this purpose may be, for example, a cooked starch modified by a urea-formaldehyde condensation product. It may be polyvinyl adhesive, or it may be a protein such as, for example, soybean protein or casein.

The cut sections of the final laminate which are conveniently made square or rectangular in shape, depending upon the peripheral shape of the final panel, are scored before the aqueous adhesive used in the final lamination adhesive has fully set. As explained elsewhere herein, this scoring may be carried out by the use of scoring rolls. The dimensions of the flat diecut shape are reduced by the scoring operation, so it is made larger than the final panel desired by the amount of this reduction. The increase in size required to compensate for the scoring depends upon the spacing of the scores and the depth to which the laminate is scored. While it is possible to calculate the shrinkage produced by a particular scoring, as a practical matter it can be readily determined by scoring a measured blank and determining the shrinkage which is produced. The reduction in dimensions of a diecut blank caused by a particular scoring will be specifically exemplified hereinafter with reference to the drawings.

After the final lamination of a facing lamination on the base lamination by the use of an aqueous solution of an adhesive, this final lamination first becomes convex with respect to the decorated side, then flat and, finally, concave. This progressive change in curvature is believed to be due to the action of the water of the adhesive in expanding the paper sheets which are wet by the aqueous adhesive, and then as the water dries causing a shrinkage which places the facing lamination under tension when the adhesive has finally become fully set. This change in the curvature of the final lamination has been found to be a convenient index of the stage of the setting of the adhesive at which the scoring operation is desirably carried out. It has been found that it is desirable to score the lamination at the intermediate stage of drying of the aqueous adhesive at which the lamination has become flat and before it becomes concave with respect to its decorated side. This scoring is carried out by the use of scoring rolls, as will be more fully described hereinafter with reference to the drawings.

In the scoring of the final lamination, it is necessary to make the scores initially deeper than the final depth desired, since the lamination exhibits a degree of elasticity which causes the scores to tend to flatten out. Thus, a lamination which is originally scored to produce scores or grooves 3/16 of an inch in depth will have grooves 3/32 of an inch deep, due to this elastic return. This behavior can be termed a "flat memory" of the original decorated lamination.

The parallel score lines of each of the two sets of score lines on each of the two surfaces of the panel blank, are of uniform depth along their lengths and may have a spacing between adjacent, parallel scores within the range of about one-half inch to about one and one-half inches. The spacings between adjacent parallel scores of the sets of scores on the opposite sides of the panel which are parallel to each other are the same. As already noted, the two sets of score lines on each of the two surfaces, positioned approximately at right angles to each other, may or may not have the same spacing between adjacent parallel score lines.

After the laminate is scored, it is then trimmed to the shape desired in the periphery of the final panel. This operation may be carried out in a number of different ways, perhaps the most efficient and convenient of which is by diecutting. This trimming operation is, preferably, carried out after the scoring operation, since the scoring operation is more readily carried out on a square or rectangular sheet than on one having a rounded or irregular periphery, and since this alternative avoids the necessity for compensating for the change in the dimensions of the laminate produced by the scoring operation.

The scored and trimmed laminate is then molded to a compound curvature by softening the foamed core of the laminate, reorienting or shifting its cell structure while in the softened state by holding the laminate in a compound curved shape and then hardening the foamed core while so held.

In the case of laminates which carry a facing laminate of two or more plies, or such a backing laminate or both, it is usually desirable to hold the laminate in a compound curvature which somewhat exaggerates the curvature which is desired in the final panel, to compensate for a tendency of the multiple facing laminate, the multiple backing laminate, or both, as the case may be, to hold their original planarity and to place the foamed core of the final laminate under tension which tends to flatten out its compound curvature.

The extent of such exaggeration of the compound curvature will depend upon the exact manner in which the foamed core is softened and in which it is held in a compound curved configuration and can be readily determined by trial and error. For example, the compound curved surfaces of the mold which are used to form the laminate may be formed with the exact configuration desired in the finished panel, a test panel made, and the mold surface ground to alter its contour to produce a panel having the desired configuration.

In carrying out this method, the step of softening the foamed core of the laminate and permitting it to harden in a curved configuration may be carried out in either of two alternative steps. The foamed core may be softened by moistening it with a volatile solvent and then hardened by the evaporation of the volatile solvent. Alternatively, it may be softened by heat and then hardened by permitting it to cool to room temperature. In the case of each of these alternatives, it is necessary to affirmatively retain the laminate in the compound curved configuration until its foamed core is at least partially hardened. In a rapid production operation, the extent to which the hardening of the foamed core is completed before the laminate is released from, affirmative retention in a compound curved configuration must be correlated with the exaggeration of the desired final curvature of the panel which is built into the mold as described hereinbefore, since the resistance of the foamed core to the flattening action of the other laminates is determined by the extent to which its hardening has been completed.

In the first of these alternative steps, the back or reverse surface of the scored and trimmed laminate is wet with a volatile, organic solvent for the foamed plastic core of the laminate, as a preparatory step to the molding of the laminate to the desired compound curvature. This wetting may conveniently be accomplished by spraying a volatile solvent for the foamed plastic core of the laminate on the surface with, for example, a paint or lacquer spray gun. It is essential to the method of this invention to uniformly wet all areas of the back of the laminate which are to be molded into any substantial curvature. In the case of a panel which is to be used as a unitary, one-piece headliner, the curvature is in the areas near the periphery of the panel with the central areas being substantially flat, so that it is essential to wet only these peripheral areas of the back of the panel with the volatile, organic solvent. However, as a matter of practice, it is generally desirable to wet the entire back of the panel with the volatile, organic solvent.

Volatile, organic solvents which may be applied to the back of a laminate in which polystyrene is the plastic material which forms the foamed core of the laminate are, for example, chlorinated solvents such as ethylene dichloride, propylene dichoride, methylene chloride, carbon tetrachloride, 1,1,1-trichloroethane, perchloroethylene, trichloroethylene, chloroform and 1,1,2-trichloroethane. These solvents are noninflammable and, hence, present no fire or explosion hazard. Of these solvents, 1,1,1-trichloroethane is preferred from the standpoints of solvent activity, volatility, toxicity, noninflammability, odor and cost. Flammable, volatile, organic solvents may be used for this purpose, while taking adequate precautions against the fire and explosion hazards which may be involved in their use. Such solvents are, for example, tetrahydrofuran, ethyl acetate, acetone, methyl ethyl ketone, methyl isobutyl ketone, dioxane, benzene, toluene and xylene. Alcohols and liquid aliphatic hydrocarbons, alone, or in admixture, can be used in admixture with the active solvents to regulate their solvent activity, to reduce cost, or both.

In this alternative step, a film-forming material may be dissolved in the volatile, organic solvent with which the back of the scored and trimmed laminate is wet. This film-forming material may be the same plastic material as that which forms the foamed core of the laminate. For example, in the treatment of a laminate having a foamed polystyrene core, polystyrene may be dissolved in the volatile, organic solvent. The upper limit on the proportion of the polystyrene dissolved in the volatile, organic solvent is that which will produce a solution which has a viscosity low enough to be sprayable and to penetrate readily the back sheet of the laminate. It has been found that an effective concentration of polystyrene within the range of about 5%, by weight, to about 20%, by weight, may be dissolved in the volatile, organic solvent and, ordinarily, it will be found that a concentration within the range of about 7%, by weight, to about 12%, by weight, is satisfactory. In general, it has been found that concentrations above about 12%, by weight offer no particular advantages. It is desirable to use a low molecular weight polystyrene for this purpose to keep the viscosity of its solution low while carrying a reasonable content of the polystyrene and thus secure a rapid and thorough penetration of the solution through the outer ply or plies of the laminate to wet its foamed core. The lower molecular weight polystyrene resins also offer the advantage of being more effective in stiffening the laminate than the higher molecular weight polystyrene resins.

Alternatively, the film-forming material which is dissolved in the volatile, organic solvent may be different in chemical composition from the foamed plastic core, but like the foamed plastic core, soluble in the solvent. Stated in another way, when a film-forming material different in chemical composition from that of the foamed plastic core is used, a volatile, organic solvent is used which is a solvent for both materials. Since it is usually desirable to use a non-inflammable solvent, it is preferable to use a film-forming material which is soluble in a non-flammable solvent for the foamed plastic material.

The addition of a film-forming material to the volatile, organic solvent with which the back of the laminate is sprayed does not have an adverse action on the desired action of the solvent in softening the foamed core, and has three advantageous effects. It strengthens and stiffens the panel; it contributes to the resistance of the panel to any loss of its final compound curved contour; and it closes the pores of the permeable back sheet and increases the moisture and water-resistance of the panel as a whole.

After the back of the panel is sprayed with a volatile, organic solvent for the plastic foamed core, or with a solution of a film-forming material in such a volatile, organic solvent, the solvent is permitted to penetrate the sprayed surface and to evaporate therefrom to a point such that the surface ceases to appear wet with the solvent and, in the alternative in which a film-forming material is dissolved in the solvent, ceases to be tacky to the touch. The time required for the surface to cease to appear wet depends upon the volatility of the solvent, i.e., its evaporation rate and the ambient temperature. When using 1,1,1-trichloroethane, the time required for this to occur is ordinarily less than one minute. During this period, the volatile, organic solvent wets the surface of the foamed plastic and softens its structure, without collapsing its cellular structure.

The next step in this method for the production of a decorative laminated panel is vacuum molding the panel in a vacuum mold. This step is carried out immediately after the sprayed back surface of the panel has ceased to have a wet appearance, and while it still carries volatile solvent.

A female mold section is utilized in the vacuum-forming operation which has concave surface contours, desired in the more concave side of the final decorative panel. In the case of a panel intended for use as a unitary, one-piece headliner for an automobile, this is the decorated side of the panel. This is a fortunate coincidence, since the method is most efficient when utilized in the formation of a panel which has a generally convex back surface.

The female mold section is provided with at least one and, preferably, more than one, orifice in its surface through which air is drawn by a vacuum pump. In addition to the female mold section, the vacuum mold is provided with a clamp frame which is usually located directly above the female mold. This clamp frame carries on its working face a compressible band of, for example, sponge rubber, which has the peripheral shape and dimensions of the trimmed laminate and has a width such that it can retain contact with the periphery of the blanket as it is contracted during the molding operation. An elastic blanket of, for example, rubber sheeting, extending over the area circumscribed by the compressible band with its edges affixed to the said compressible band, seals the mold and permits its evacuation to permit the elastic blanket to be forced against the mold under atmospheric pressure.

In this vacuum-forming step, the scored and trimmed laminate is placed on the female mold with its outer edges in contact with the edges of the female mold. The compressible frame is then moved to bring its compressible band against the peripheral edge of the laminate and its elastic blanket adjacent its surface, effectively sealing the periphery of the laminate against the periphery of the female mold. Air is then evacuated from the cavity formed between the contoured surfaces of the female mold and the adjacent surface of the laminate. Atmospheric pressure bearing on the elastic blanket and, in turn, on the surface of the laminate presses it into uniform and light contact with the contoured surface of the female mold section, and gives the laminate a compound curved contour.

During this operation, the volatile, organic solvent carried by the laminate as it goes into this forming step, is evaporated at a rapid rate from the interior of the laminate, due to the materially reduced pressure of its environment within the vacuum mold. This removal of the volatile solvent from the laminate causes its foamed plastic core to harden with a reoriented cell structure while retained in the desired curved contour. In the embodiment of this step in which a film-forming material is included in the volatile solvent, the deposition and hardening of the film-forming material by the evaporation of the volatile, organic solvent has an additive effect in causing the panel to retain the compound curvature molded into it by the vacuum-forming step.

The removal of solvent from the laminate is more effective in the molding of a laminate to produce a panel which is decorated on its generally concave side, since in the molding of such a panel its entire back or reverse surface is subjected to the reduced pressure, with the result that a relatively high proportion of the volatile, organic solvent is removed from the laminate while it is held in the desired compound curved form. Such solvent removal in the vacuum mold is not essential to its successful operation, but is highly advantageous since the compound curvature is more completely fixed when the panel is removed from the mold and, hence, it requires less careful handling in the subsequent steps in which the solvent removal is completed.

As soon as the laminate is fully in contact with the surfaces of the female mold, the vacuum on that side of the laminate is released and the laminate removed from the mold. This vacuum-forming operation is then followed by a final step in which the residue of the volatile, organic solvent which is still retained by the laminate is substantially completely removed. Such removal of residue solvent can be effected by merely exposing the panel to the ambient atmosphere. In production operations, it is usually desirable to speed up its removal by superficially heating the back surface of the panel, as by passing it under a bank of infrared electric heating lamps and exposing it to a forced circulation of air.

The second alternative which may be followed in the step of softening the foamed core of the laminate and permitting it to harden in a curved configuration comprises heating the foamed core to a predetermined, elevated temperature at which it is softened and sufficiently plastic to permit a reorientation of its cells, but not sufficiently fluid to permit any extensive collapse of its cells. The maximum temperature which can be used depends upon the melting point of the foamed plastic and the rate at which the plastic softens as it approaches its melting point. The maximum temperature to which an outer surface of the laminate is exposed to raise its foamed core to the predetermined temperature must not exceed that which can be tolerated without damage by the outer plies of the lamination. In the case of a lamination which has an outer ply or plies of paper through which heat must pass to raise the temperature of the foamed core to the desired level, we prefer not to exceed about 120° C. for this surface temperature.

Elsewhere in this disclosure, we have referred to the fact that we have found a commercial product sold under the trademark "Fome-Cor" suitable for use as a component of the laminated panel in accordance with this invention. This product has a foamed polystyrene core. We have found that this polystyrene core should be heated to a temperature within the range of about 90° C. to about 110° C. and preferably to a temperature of about 95° C. and then cooled while retained in a compound curvature. Temperatures above about 110° C. caused the foamed core to lose its uniform cellular structure with a resulting embrittlement and to lose its adhesion to plies of paper on its outer surfaces. Temperatures below about 90° C. failed to soften the polystyrene to a degree such that it had a reasonably high retention of its molded shape after it is cooled.

In carrying out this alternative step, the laminate may be heated to raise the temperature of its foamed core to the described level either before it is deformed to a compound curved contour or after it is so deformed and while it is held in that contour. The heat may be applied by any of the numerous well-known ways for raising the temperature of such an object. It may, for example, be heated prior to molding in a warming oven or it may be passed through a heating zone which utilizes steam heat, electrical radiant heat, or infrared heat. Again, it may be heated within a mold which has a surface heated by steam coils, electrical resistance coils, or other suitable sources of heat.

The vacuum-forming operation gives the laminate a compound curved contour which accurately reproduces the compound curvature of the female mold without wrinkles, folds or breaks in the outer sheets of the lamination. The score lines are still retained and, as already noted, form a feature of the decoration of the face of the panel. Although a superficial comparison of the score lines of the laminate before and after its molding to a compound curvature reveals no noticeable change in the dimensions of the individual scores, the scores are essential to the formation of the compound curved contour with the formation of unsightly wrinkles, folds and even ruptures in the surface layers of the laminate, inasmuch as it has been found that a laminate which has not been scored, but which is otherwise identical to the scored laminates described in the foregoing, cannot be molded to compound curvatures without the unsightly wrinkles and folds.

In the foregoing, reference has been made to the "flat memory" of the panel which causes the score lines to tend to flatten out. The original lamination as a whole has a "flat memory" which causes it to return to a planar surface after it has been curved by a mechanical flexing. However, after subjecting the flat lamination to the foregoing sequence of steps in which it is treated with a volatile solvent for the foamed plastic core, vacuum molded into a compound curved shape and freed of the volatile solvent, the lamination then has a "curved memory" which causes it to return to the compound curved shape after being distorted therefrom by a mechanical force. This characteristic of an elastic return to its original compound curved shape after deformation therefrom is an important and valuable characteristic of this decorated, laminated panel.

Having indicated the general nature of the method in accordance with this invention for the production of a decorated, laminated panel, this method and the product thereof will be specifically illustrated and described in greater detail with reference to the accompanying drawings, in which like reference characters are used to refer to like parts wherever they may occur.

In the drawings:

FIGURE 4 is a flow sheet showing a sequence of steps which may be followed in the method of this invention, to produce a decorative laminate having a compound curved contour;

Figure 6:
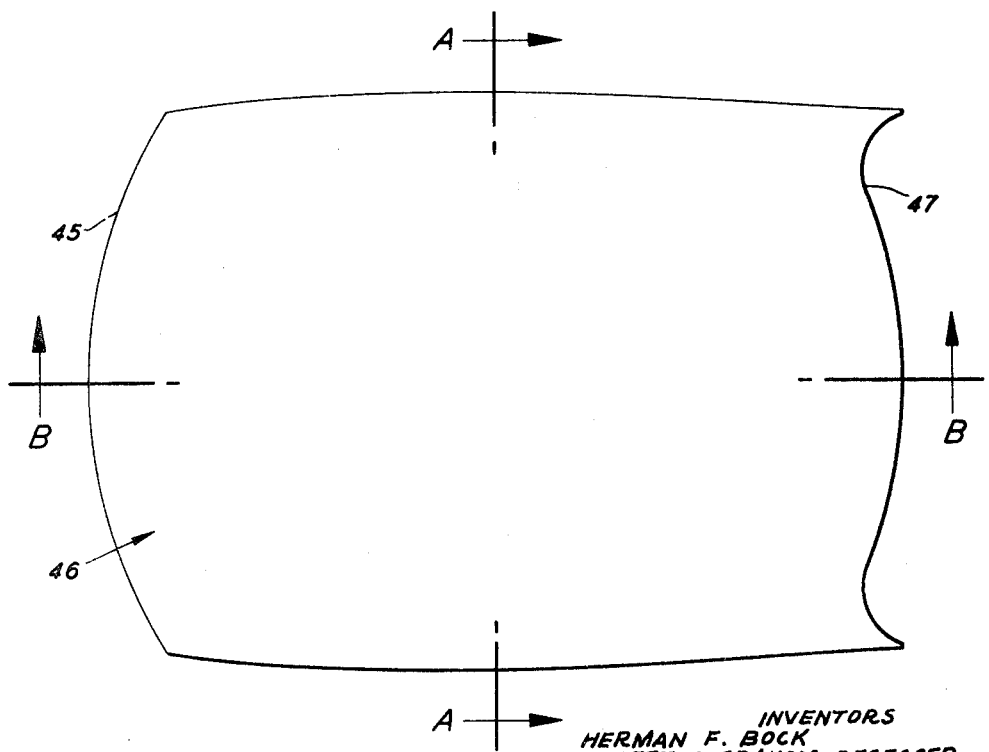
FIGURE 6 is a plan view illustrating the peripheral shape of a blank of a decorative panel, which has been trimmed preparatory to molding to a compound curved contour, adapting it for use as an automobile headliner.
Figure 9:
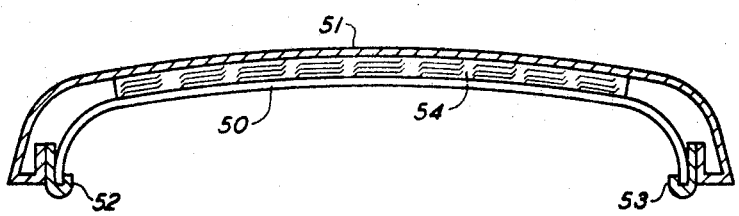
Figure 10:
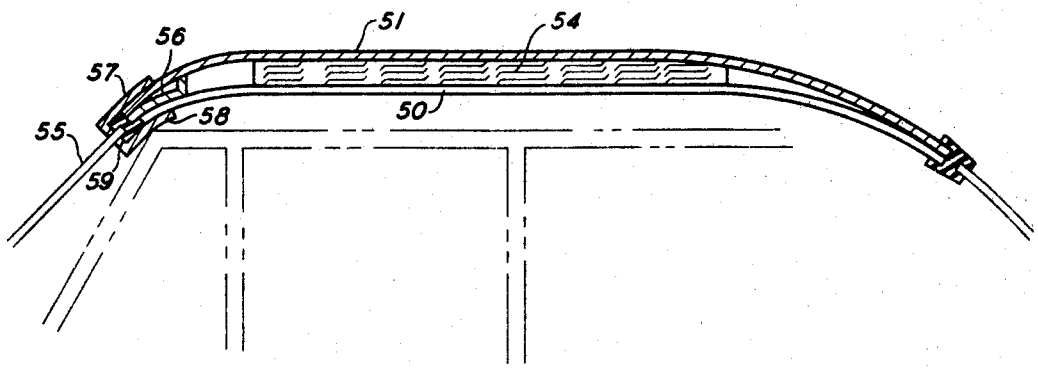

FIGURE 9 is a schematic, cross-sectional view of an embodiment of the decorative, laminated panel produced by the method of this invention, installed in an automobile as a unitary, one-piece headliner, taken along the section line A—A of FIGURE 6, and across the top of the automobile; and FIGURE 10 is a schematic, cross section of the headliner of FIGURE 9, taken along the section line B—B of FIGURE 6, and along the length of the automobile.

FIGURE 11 is a graph illustrating the relationship between the temperature of the foamed polystyrene core of a laminate in accordance with this invention and the percentage retention of a curved contour of the laminate which was produced by deforming the laminate while the core was at the indicated temperature and cooling it while in the deformed conformation.

Figure 1:
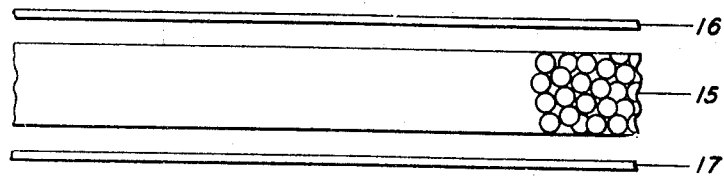
FIGURE 1 is a fragmentary, exploded and enlarged cross-sectional view illustrating the layers which are adhered together to form a blank which is an intermediate in the production of one of the embodiments of the decorative, laminated panel produced by the method in accordance with this invention.

Referring specifically to FIGURE 1, it will be seen that the illustrated form of the blank from which one of the embodiments of this decorated, laminated panel is produced consists of a foamed plastic core 15, a sheet of undecorated paper 16 which is adhered to one of the surfaces of the foamed core 15, and a sheet 17 of decorated paper, a decorated or undecorated plastic film or a foamed plastic sheet which is adhered to the other of the surfaces of the foamed core 15 to form the face of the panel blank. The paper or plastic film 17 may be decorated by printing or embossing or by a combination of both. The plastic film may be transparent, revealing the surface of the foamed plastic core 15 which gives a decorative effect. A foamed plastic sheet 17 is preferably of the flexible type, as compared with the rigid type used for the core 15. It may be, for example, a sheet of flexible polyurethane foam. A foamed plastic sheet 17 will ordinarily be thicker than a sheet of paper or of unfoamed plastic film and may, for example, be of a thickness within the range of about $\frac{1}{16}$ to about $\frac{3}{16}$ of an inch.

The blank illustrated by FIGURE 1 may be produced by preparing the foamed plastic core 15 in direct contact with the sheets 16 and 17. In this alternative, the foamed plastic core acts as its own adhesive, so no films or layers of adhesive are required between the sheets 16 and 17 respectively, and the surfaces of the foamed plastic core. However, when the foamed plastic core 15 is not formed in contact with sheets 16 and 17, it is necessary to use a film or layer of adhesive, not shown by the drawings, to laminate the sheets 16 and 17 to its surface.

Figure 2:
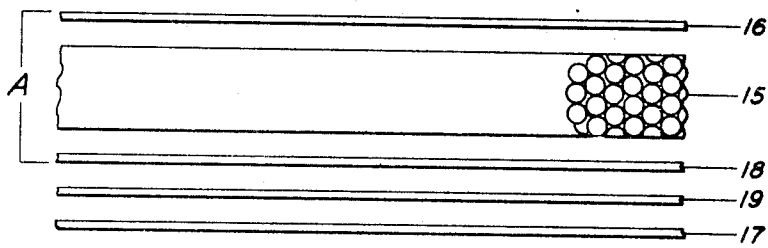
FIGURE 2 is a fragmentary, exploded and enlarged cross-sectional view illustrating the layers which are adhered together to form a blank which is an intermediate in the production of a second embodiment of this decorated, laminated panel.

FIGURE 2 illustrates the layers which are used to form a blank consisting of a foamed plastic core 15, an undecorated paper sheet 16 which forms the back of the panel, a paper sheet 18 which forms an intermediate between the foamed plastic core 15 and the outer sheet 17 which, as in the case of the embodiment illustrated by FIGURE 1, may be a sheet of decorated paper, of a decorated or undecorated plastic film, a foamed plastic sheet, or a sheet of a woven textile fabric which forms the face of the panel. The sheets 16 and 18 need no adhesive to adhere them to the foamed plastic core 15 when the foamed plastic core is formed in contact with their surfaces. A laminate A of a foamed plastic core 15 with the sheets 16 and 18 may be prepared as described hereinbefore. A product which is entirely suitable for use in accordance with this invention is commercially available, and is sold under the trademark "Fome-Cor." However, as in the case of the embodiment illustrated by FIGURE 1, a film or layer of adhesive, not shown by FIGURE 2, must be interposed between the surfaces of the foamed plastic core 15 and the paper sheets 16 and 18 when the foamed plastic core 15 is preformed.

Still referring to FIGURE 2, the outer sheet 17 of decorated paper, decorated or undecorated plastic film, or of a foamed plastic sheet is adhered to the outer surface of the sheet 18 by a layer or film of adhesive 19. In general, it is desirable that the film 19 be a water-insoluble adhesive formed by the drying of an aqueous solution, so that the timing of the scoring of the blank laminate can be coordinated with its drying, as described hereinbefore. However, in the alternative embodiment in which the sheet 17 is a decorated paper sheet, the film 19 may be of a thermoplastic resin, such as polyethylene or polypropylene, which can function as its own adhesive.

Figure 3:
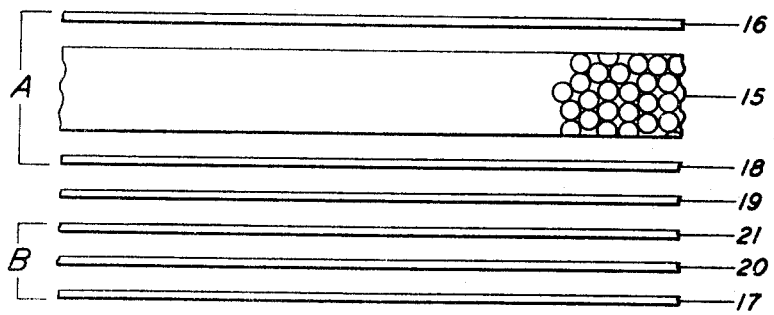
FIGURE 3 is a fragmentary, exploded and enlarged cross-sectional view illustrating the intermediate laminates which are adhered together in the production of a third embodiment of this decorated, laminated panel.

The laminate A of FIGURE 3 is identical to the laminate A of FIGURE 2. The final blank illustrated by FIGURE 3 may be built up by the addition of the successive layers of the blank to laminate A. However, it is usually convenient to produce the laminate B as a separate unit and then adhere this laminate to laminate A to produce the blank. Laminate B consists of a sheet of paper 21 adhered to a sheet 17 of decorated paper, of a decorated or undecorated plastic film, or of a foamed plastic sheet which forms the face of the panel, by a film 20 of an adhesive. The film 20 may be a film of a water-insoluble adhesive deposited from an aqueous solution. In the alternative in which the sheet 17 is a decorated sheet of paper, it is desirable to use a film 20 of a thermoplastic resin such as polyethylene or polypropylene and form the lamination by the hot extrusion of the polyethylene or polypropylene as described hereinbefore. The use of a thermoplastic resin as the film 20 in the alternative in which the sheet 17 is a decorated paper sheet is desirable to improve the moisture and water vapor resistance of the decorated panel, but is generally not necessary when the sheet 17 is an unfoamed or a foamed plastic sheet. This laminate B is adhered to the laminate A, with the sheet 17 of laminate B facing outwardly, by a film or layer 19 of a water-insoluble adhesive deposited from an aqueous solution.

FIGURE 4 is a flow sheet of the steps which may be carried out by the method of this invention for the production of a decorative laminate having a compound curvature, which is composed of the layers illustrated by FIGURE 3, which has been described hereinbefore. Referring specifically to FIGURE 1, Step 1–A, in which the laminate, illustrated as laminate "A" by FIGURE 3, having a core of a rigid foamed plastic, may be carried out as indicated by the continuous introduction of a mixture of a plastic material and two continuously moving and converging webs of paper, and the resulting laminate trimmed into rectangular or square sheets which are somewhat larger than the decorative panel which is to be produced. Alternatively, the sheets of paper may be cut into square or rectangular shapes of the desired dimensions and the rigid foamed plastic core produced in situ between them. Again, but less desirably, a rigid foamed plastic sheet of the desired dimensions may be produced and then paper sheets adhered to each of its surfaces by the use of a suitable adhesive. Detail as to the formation of the foamed plastic core of the laminate has been given hereinbefore.

Step 1–B of FIGURE 4 is carried out independently of Step 1–A. These steps may be carried out at different times and at different locations, or both. In Step 1–B, the laminate of, for example, two sheets of paper bonded by a continuous sheet or film of a thermoplastic resin such as, polyethylene resin, may be initially formed as a continuous web or as separate sheets of the desired size. This laminate, identified as laminate "B" by FIGURE 3, is most efficiently produced by the continuous, hot extrusion of a film of the thermoplastic resin between two converging webs of paper, followed by a cutting of the continuous laminate into sections of dimensions suitable for lamination by a film of adhesive to the laminate A. In carrying out this step, one of the continuous webs of paper may be decorated on one side by printing, embossing, surface coating or a combination thereof, to form the decorative face of the final panel, before Step 1–B is carried out. The undecorated back of such a decorated sheet is brought into contact with the heat softened plastic film of thermoplastic resin in the lamination of Step 1–B.

As an alternative to the formation of the laminate "B" by the lamination of a paper web which has one decorated side with an undecorated web of paper is Step 1–B, two webs of undecorated paper may be laminated as described in the foregoing, one outer surface of the resulting continuous laminate decorated for example, by printing, embossing, surface coating or a combination thereof, and then the web cut into sheets of the desired size.

In Step 2, the laminates "A" and "B" are adhered together, preferably by the use of an aqueous adhesive which becomes water insoluble upon setting. Such lamination of the sheets of the laminates "A" and "B" follows well established practices of the prior art. However, in the method of this invention, the resulting lamination is preferably scored in Step 3, before the aqueous adhesive is fully set or cured.

The foregoing Steps 1–A, 1–B and 2 are those carried out in the production of the laminate blank illustrated by FIGURE 3, which from the standpoint of essential physical characteristics and cost, is the preferred form of the laminate blank. The overall thickness of this laminate blank will generally fall within the range of about 100 mils to about 250 mils. We have found that a laminate blank having a thickness of about 125 mils produces an entirely satisfactory headliner for automobiles. The modification of these steps to produce the laminates illustrated by FIGURES 1 and 3 will be obvious from the foregoing description of these steps. Regardless of the details followed in the preparation of a laminate having the exact structure desired, the laminate involved is processed by the steps which are described in the following.

The duplex scoring identified as Step 3 and the trimming of the laminate to the desired peripheral shape identified as Step 4 by FIGURE 4, may be carried out in either order or even simultaneously, depending upon the means which are employed to accomplish each of these steps. For example, the duplex scoring step may be carried out by a light compression of the laminate between two suitably contoured dies, which impresses the desired score lines in the surfaces of the laminate without compressing or destroying the cellular structure of the plastic foamed core of the laminate, and the laminate may be trimmed to the desired periphery, Step 4, by a diecutting operation. These two steps may be combined into a single operation. However, the scoring of the laminate by a light compression of the laminate is a difficult operation, requiring expensive dies, since the scoring tends to produce a shinkage of the dimensions of the sheet which can cause a rupture of the one or more plies of the laminate when the sheet is held near its edges as the score lines are impressed upon its central areas.

Figure 5:
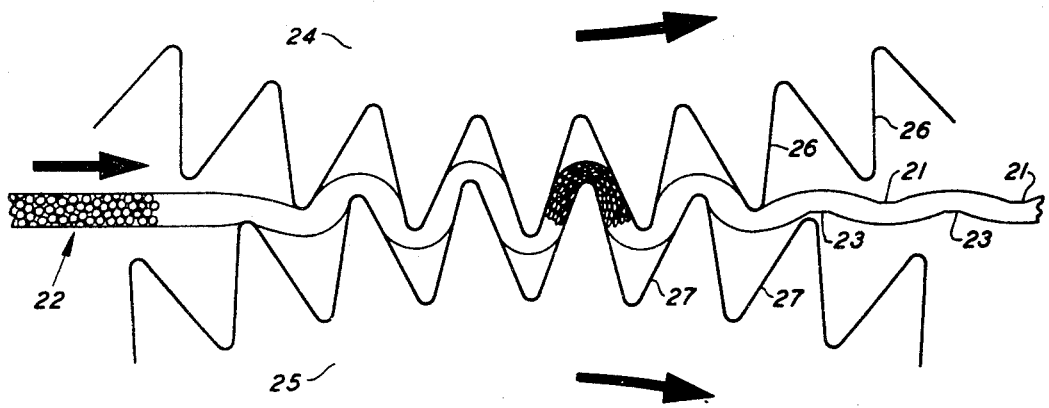
FIGURE 5 is a schematic illustration of the scoring of a square of rectangular decorative laminate with parallel scores on both sides by the use of scoring rolls, which are shown in fragmentary cross section.

It has been found in production operations that the duplex scoring operation of Step 3 can be efficiently and economically carried out by passing the laminate blank between scoring rolls as schematically illustrated by FIGURE 5. Although it is possible to carry out the trimming operation to give the laminate the desired periphery, shown as Step 4 by FIGURE 4, ahead of the scoring operation, it is preferable to carry out these operations in the reverse sequence since the trimming of the laminate before scoring requires a compensation for the shrinkage of the overall dimensions of the laminate by a subsequent scoring operation, and since the scoring of the laminate can be more readily carried out with an accurate positioning of the scores when the laminate has a straight sided, square or rectangular periphery than when it has an irregular, rounded periphery such as that illustrated by FIGURE 6.

Referring specifically to FIGURE 5, it will be seen that the scoring operation illustrated by that figure imposes a set of parallel, equidistant score lines 21—21 on one surface of the laminate 22, shown as the upper surface by the figure, and a second set of parallel, equidistant score lines 23—23 on the reverse surface of the laminate. The score lines 21—21 and 23—23 have the same spacing between them and are parallel to each other.

The scoring rolls 24 and 25, shown in fragmentary cross section by FIGURE 5, having equally spaced teeth 26—26 and 27—27 around their circumferences. These teeth extend the length of the rolls and are parallel to the areas of the rolls. The outer edges of the teeth 26—26 and 27—27 are rounded or squared with rounded edges to the shape desired in the bottom of the score lines.

The rolls 24 and 25 are each positively driven through a gear train, not shown by the drawings, which positively fixes both their relative speeds of rotation in the opposite directions shown by the arrows of FIGURE 5, and the relative positions of their respective teeth during their rotation. The rolls 24 and 25 may be of the same diameter, have the same number of teeth, and be rotated at exactly the same speeds. During their rotation, their teeth are positioned relative to each other in positions such that a tooth on one roll is opposite to the midpoint between two adjacent teeth on the opposite roll at their point of closest approach during their rotation. The rolls 24 and 25 are spaced apart in positions which place their respective teeth in positions to bear forcefully on the surface of a laminate to impress scores in the respective surfaces of the laminate which are enough deeper than the score lines desired to compensate for the elastic recovery or flat memory of the laminate without crushing the foamed core of the laminate. The exact spacing between the rolls 24 and 25 required to accomplish this result is determined by the thickness of the laminate which is scored, the depth of the scores desired, and the extent of the elastic recovery of the score lines after they are impressed in the surfaces of the laminate. It is desirable to have edge guides adjacent the feed side of the rolls 24 and 25 and adjacent the exit side of these rolls, to assure the passage of a square or rectangular sheet through the rolls with its leading and trailing edges parallel to the teeth of the rolls.

It will be obvious from the foregoing that the rolls 24 and 25 may be of different diameters, with the smaller roll having the fewer number of teeth and being rotated at a higher speed than the larger roll. It is essential that the speeds of rotation and the number of teeth on rolls of two different sizes be coordinated so that the teeth of the respective rolls alternatively contact the opposite surfaces of a laminate at equally spaced intervals to produce parallel score lines, which are directly opposite the midpoint between adjacent score lines on the opposite surface.

As will be appreciated from the foregoing, one passage of a laminate between a pair of scoring rolls produces a single set of parallel score lines on each of the surfaces of a laminate. To produce a square waffle pattern of score lines 21—21 and 28—28, FIGURE 8, on the surfaces of the laminate, a second set of score lines may be impressed at right angles to the first set of score lines on each surface by rotating the laminate through 90° around an axis normal to its surfaces, and passing it a second time between the same scoring rolls or between a duplicating set of such rolls. To produce a rectangular waffle pattern on the surface of the laminate, it is rotated through the angle of 90° and passed between a second set of scoring rolls which have teeth spaced differently from those of the first set of rolls.

Referring again to FIGURE 4, Step 4, as already noted, consists of trimming the laminate to the desired peripheral shape as, for example, illustrated by FIGURE 6 and is, preferably, carried out after the scoring step as shown by the figure. This step may be carried out in any one of a number of ways known to the art. It has been found that it may be expeditiously carried out by a diecutting operation.

The next step in the treatment of the scored and trimmed laminate by the method of this invention is the softening of the foamed plastic core of the laminate, its deformation to the desired contour followed by its hardening while in that contour. As described hereinbefore, this step of our method may be carried out in either of two alternative ways. It may be carried out by the use of a volatile solvent for the foamed plastic core or by the use of heat. The sequence FIGURE 4 illustrates by its Steps 5–8, inclusive, the first of these alternatives. Step 5 of FIGURE 4 is the wetting of the back of the laminate with a volatile, organic solvent for the foamed plastic core of the laminate, in at least those areas which are to be molded into compound curves. The entire reverse surface of the laminate may be wet with the volatile, organic solvent and is, preferably, wet with the volatile, organic solvent which has dissolved therein a film-forming material which may be of the same chemical composition as the foamed plastic core of the laminate, or of a different chemical composition, but which is also soluble in the volatile, organic solvent. The reverse surface of the laminate may be wet, or a portion of its area, or its entire area, with the volatile, organic solvent, or with the solution in any convenient manner such as, for example, by spraying.

After the reverse surface has been wet with the volatile, organic solvent or with the solution as described hereinbefore, its surface is permitted to become superficially dry in appearance by the evaporation of solvent therefrom and by the penetration of the solvent through the back sheet to wet the surface of the foamed plastic core. The interval of time required is relatively short and, in the case of a volatile, organic solvent which does not contain a film forming material, is solely a measure of the time required for the solvent to have the requisite softening action on the foamed plastic core, since any superficial solvent on the surface has no adverse effect on the vacuum-molding step. When following the alternative in which the reverse surface is wet with a solution of a film-forming material in the volatile, organic solvent, this time interval is a measure of both of the time required for the solution to penetrate the back sheet to wet and soften the foamed core and for it to evaporate from the surface of the sheet to an extent such that the residual film-forming material remaining on the surface is not tacky. The time interval required depends upon the volatility of the organic solvent and, in the case of a solution of a film-forming material, the viscosity of the solution and the tendency of a partially dried film of the film-forming material to be tacky. In the case of 1,1,1-trichloroethane or a solution of about 10% by weight of polystyrene in this solvent, the time interval required is not more than about one minute. At the end of this time interval, the laminate is subjected to the vacuum-forming step, identified as Step 7 by FIGURE 4, while it still carries the volatile, organic solvent and its foamed plastic core is in a softened state.

Figure 7:
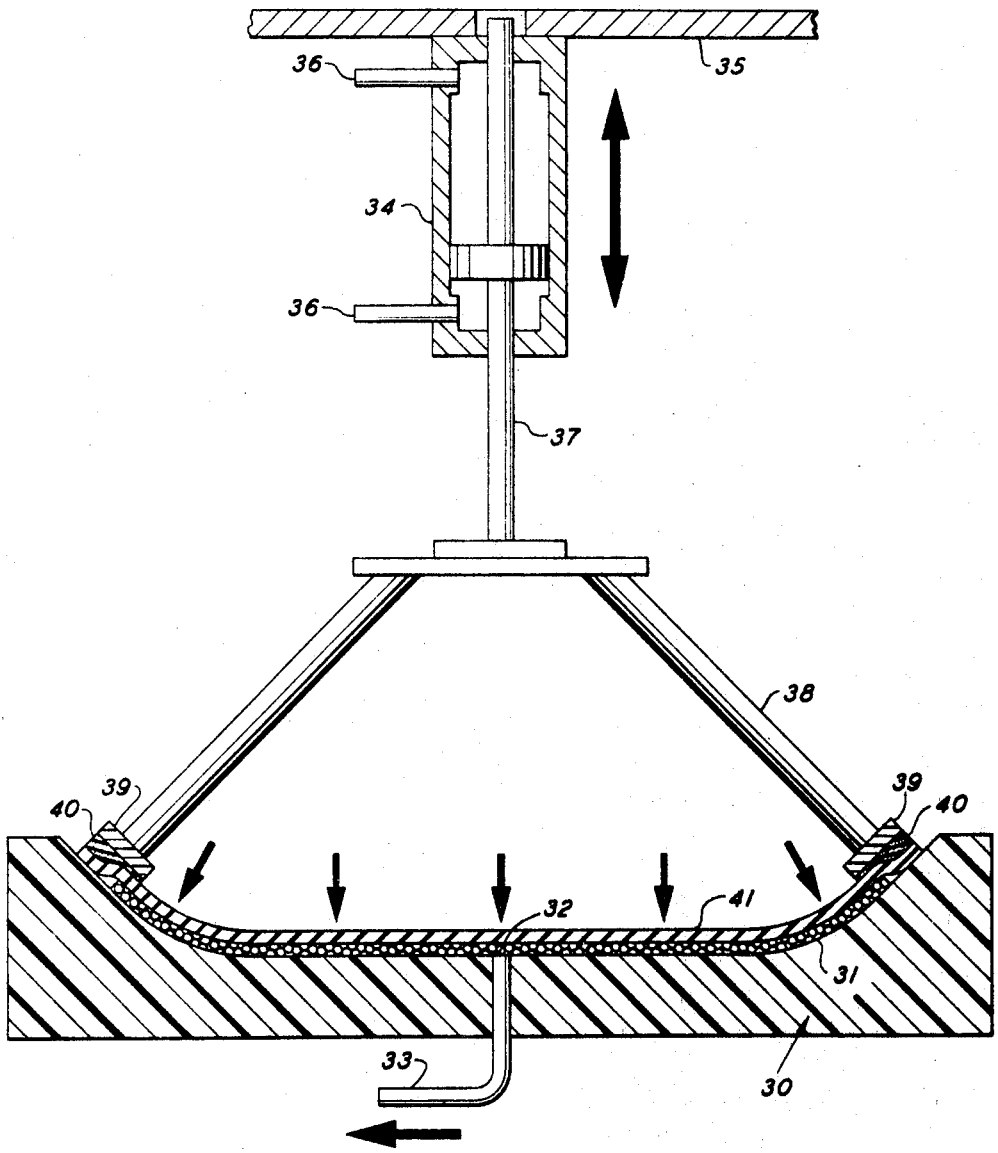
FIGURE 7 is a schematic, cross section of a vacuum mold in closed position, with a scored and trimmed decorative laminated blank in position for vacuum-forming by the application of vacuum to the mold.

FIGURE 7 shows a schematic cross section of a vacuum mold which is effective and convenient for carrying out the vacuum-forming step, with a laminate in position for molding by the application of a vacuum to the mold. Referring specifically to that figure, it will be seen that this mold comprises a mold section designated generally by the numeral 30, which has a surface contour corresponding to the more concave side of the final decorative panel desired. The surface cross section of the surface 31 of the mold shows with an exaggerated curvature, the cross section for the molding of a unitary, one-piece headliner corresponding to the section line A—A of FIGURE 6. The mold section 30 may be made, for example, of gypsum plaster, epoxy resin, an ethyl cellulose plastic, a metal or other suitable material chosen on the basis of the amount of use which the mold section is to receive. Guide pins, not shown by the figure, are located at suitable positions in the periphery of the mold surface 31, to assure the accurate placement of a laminate in the mold. The mold section 30 is provided with at least one orifice 32, connected by a flexible conduit 33, to a vacuum pump, not shown by the drawings. As illustrated by FIGURE 7, it is convenient to position the mold section 30 with its mold cavity facing upwardly.

A double acting hydraulic cylinder 34 is positioned above the mold section 30 and carried by a suitable, fixed, supporting means 35. The cylinder 34 is connected to a source of hydraulic fluid by the conduits 36—36 and provided with the usual controls. The lower end of the piston rod 37 of the hydraulic cylinder 34 carries a frame 38, two of the legs of which are shown by FIGURE 7. The frame 38 carries a lower band 39 of a structural material, the outer edge of which has the same peripheral shape as that of the laminate to be molded, as illustrated, for example, by FIGURE 6. The lower surface of this band is angulated outwardly at approximately the same angle as that of the adjacent outer edge section of the mold surface 31, and carries on its lower and outer angulated surface a band 40 of a resilient material such as, for example, a sponge rubber or a resilient foamed plastic. In the case of a mold adapted for the vacuum-forming of a unitary, one-piece headliner, the supporting band 39 and the resilient band 40 may be, for example, about 4 inches wide and the band of resilient material about one inch thick. A blanket 41 of an elastic material is located within the area circumscribed by the bands 39 and 40, with peripheral areas extending across and sealed to the lower and outer angulated surface with an airtight seal. This elastic blanket 41 which may, for example, be an elastic rubber sheet, is relatively loose in the area within the resilient band 40, but becomes taut when vacuum is applied to the mold during its operation.

In the vacuum-forming step, Step 7, FIGURE 4, the scored and trimmed panel blank which has had its reverse or back undecorated surface wet with a solution of a film-forming material, as described hereinbefore, and which still carries residual organic solvent, is placed over the mold cavity while the frame 38 is held in its raised position by the hydraulic cylinder 34, and accurately positioned with respect to the periphery of the mold cavity with the assistance of the guide pins mentioned above. It is preferable to have the mold designed so that the laminate is properly placed to secure the desired compound curved contour with its reverse surface facing downwardly. When placed over the mold cavity, the laminate tends to sag since its foamed plastic core had been softened by the action of the volatile, organic solvent.

The frame 38 is then lowered into a position which places the edge area of elastic blanket 41 which is sealed to the resilient band 40 in contact with the peripheral edge area of the laminate on the female mold section. The supported areas of the elastic blanket are held, by the hydraulic cylinder 34, in contact with the peripheral areas of the laminate blank with a force which provides a relatively airtight seal around the edges of the laminate, but which permits the peripheral edges of the laminate to slide inwardly with respect to the mold surface 31. A vacuum is then drawn through the orifice 32, under the laminate, while still retaining the seal around its periphery, permitting the atmospheric pressure above the elastic blanket 41 to force the lower surface of the laminate into intimate contact with the mold surface 31. When the laminate has come to its final position against the mold surface 31, its edges are still held in position by the resilient band 40 and the outer edge of the elastic blanket 41 is held against the surface 31 of the mold 30, completing the vacuum seal. Stated in another way, the band 40 is wide enough, of a peripheral dimension, and in an initial holding position with respect to the periphery of the laminate when in its initial position in the mold, such that no part of the periphery of the laminate slides beyond its inner edge during the vacuum-forming operation. The width of the band 40 which is required to accomplish this is determined both by the dimensions of the decorative panel being produced, and by the extent of the curvature which is imposed during the vacuum-forming. As already noted, a width of four inches has been found adequate for the band 40 in the vacuum-forming of a unitary, one-piece headliner for an automobile.

During this vacuum-forming operation, the materially lowered pressure to which the laminate is subjected removes a large part of the volatile organic solvent from the laminate. The completeness of this removal depends upon the boiling point of the organic solvent, and upon the extent of the evacuation of the mold. It is desirable to utilize a solvent which has a high vapor pressure under the minimal pressure reached in the mold during the vacuum-forming operation to remove a major portion of the solvent from the laminate, while it is in the mold under the reduced pressure.

After the laminate has been forced by atmospheric pressure to its final position in which it is in close contact with the surface 31 of the mold member 30, the vacuum is released and the frame 38 is raised by the reverse action of the double acting cylinder 34. This frees the laminate within the mold member 30, so that it can be readily removed from the mold. The laminate now has a compound curved curvature with a definite memory of that curvature, as contrasted to its flat memory prior to the molding operation. Thus, if a curved portion of this laminate is forcefully flattened and then released, it will return to its original curvature.

After the removal of the formed laminate from the vacuum-forming mold, it is then treated to remove the minor remaining residue of the volatile, organic solvent, and free it of any residual odor of the solvent. This treatment is identified as Step 8 of FIGURE 4. This treatment may consist of merely exposing the material to the ambient atmosphere for an "ageing" period. In production operations, this treatment can be expeditiously carried out by heating the reverse or back surface of the laminate to an elevated temperature below that at which the laminate is damaged as, for example, by passing it under a bank of infrared electric heating lamps and exposing it to a forced circulation of air.

In following the alternative of softening the foamed core of this laminate by the use of heat and then hardening it by permitting it cool while retained in a compound curved contour, a heating step is substituted for Steps 5 and 6 illustrated by FIGURE 4 and a cooling step for Step 8 illustrated by that figure. The heating step may be carried out prior to the vacuum-forming of Step 8, for example, by placing the scored and trimmed laminate in an oven, preferably having a forced circulation of air, which is at the temperature to which it is desired to heat the core of the laminate to reach that of the oven is determined by the number of plies which form its facing and backing laminate. We have found that a period of four to six minutes is usually adequate for the temperature of the foamed core to come to equilibrium with that of the oven.

As already noted, the temperature to which the foamed core is heated is determined by its melting point. As noted hereinbefore, in the case of the foamed polystyrene resin core of the commercial product known as "Fome-Cor," we have found that it is desirable to heat the foamed core to a temperature within the range of about 90° C. to about 110° C. and preferably to a temperature of about 95° C. to secure a high retention of the compound curved contour.

FIGURE 11 illustrates the relationship between the percentage retention of a curved contour by a laminate which has a "Fome-Cor" polystyrene foamed core. The data shown by the curve of FIGURE 11 was obtained by wrapping strips of the laminate illustrated by FIGURE 3 which were three and one-half inches wide and fourteen inches long around a cylinder having a diameter of three and five-eighths inches, taping the strip to retain it in position and placing the assembly in a forced air circulation oven held at the indicated temperatures. The assembly was left in the oven for a period of about five minutes, removed therefrom and permitted to cool to room temperature. The tape which forced the strips to retain the cylindrical shape were then removed and the percentage retention of the cylindrical shape measured.

Referring specifically to FIGURE 11, it will be seen that with this particular foamed polystyrene core, the laminate retained about 43% of the cylindrical shape after being heated to a temperature of 60° C. and that the percentage retention increased rapidly with higher temperature until it reached a retention of about 95% at a temperature of 105° C. Higher temperatures failed to increase this percentage retention to 100%. The fact that the higher temperature did not increase the percentage retention to 100% is believed to be due to the "flat memory" of the facing laminate, which was not affected by the heat treatment.

The heating of the laminate prior to the vacuum-forming operation, Step 7 of FIGURE 4, can be carried out in many different ways. In a production operation, it may be carried out by passing the scored and trimmed panels through a heating tunnel in which the required heat is furnished, for example, by steam coils, electrical resistance coils or infrared heating lamps.

The heating of the laminate may be carried out simultaneously with the vacuum-forming step illustrated as Step 7 of FIGURE 4. This may be done by providing a means for heating the mold in which the flat scored and trimmed laminate is formed. Referring specifically to FIGURE 7, the heat required to raise the temperature of the foamed core to the desired level can be provided by steam coils or electrical resistance coils embodied in the mold section, designated generally by the numeral 30 adjacent its upper surface as illustrated by that figure. The heating coils should be disposed within the mold section 30 in a manner such that the upper surface of the mold surface is heated uniformly to the desired temperature. These coils should be located reasonably close to the upper surface of the mold section 30 to provide an efficient use of the heat, but not so close as to interfere with any alteration of the mold surface which may be required to compensate for the percentage retention of the compound curved laminate which has been discussed hereinbefore with reference to FIGURE 11.

Figure 8:
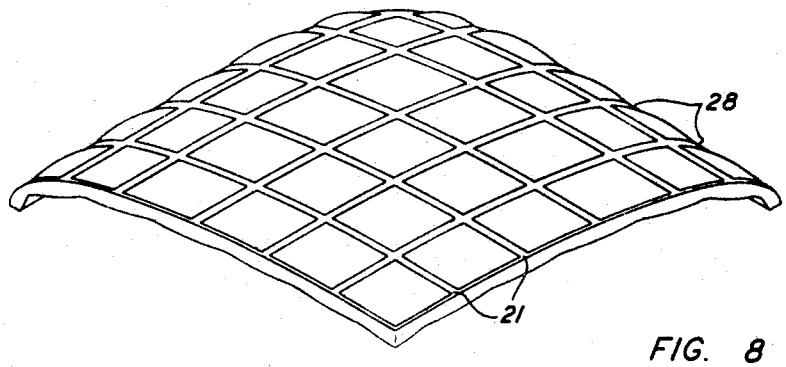
FIGURE 8 is a perspective view of a decorative laminated panel produced by the method in accordance with this invention, which has been molded to a compound curved contour.

The decorative, laminated panel produced as described by the foregoing carries a waffle pattern of score lines on both surfaces, has one surface which, in addition to the waffle pattern of score lines, has a compound curved curvature and a permanent memory of that compound curvature. A fragmentary section of such a panel is illustrated by FIGURE 8.

The compound curved panel produced by this method is characterized by its regular score lines and its otherwise smooth, unwrinkled surfaces on both the decorated and the reverse or undecorated sides. Further, it is characterized by a curved memory which causes it to return to its curved contour after it has been forced from that curvature. This curved memory is created in the foregoing method by the softening of the foamed plastic core by the action of the volatile, organic solvent, followed by the removal of the organic solvent while the plastic core is in the compound curved contour. In the embodiment in which the reverse side of the laminate is treated with a volatile, organic solvent containing a film-forming material dissolved therein, the film-forming material contributes to the compound curved memory of the plastic core by its drying on the surface of the core and within the backing sheet while both are in a compound curved configuration.

In the foregoing, the term "vacuum-molding" has been used to identify the step by which the laminate is given a permanent, compound curved contour. This step is a modification of the vacuum-forming technique used for the molding of hot plastic sheets, frequently referred to as one of the "thermoforming" techniques. It will be obvious to those skilled in the art of thermoforming plastic sheets, in view of the foregoing description of the modification of the conventional vacuum-forming techniques used in the molding of plastic sheets, that by parallel modifications the drape vacuum-forming technique for the forming of plastic sheets using a male mold, and the blow-molding technique employing superatmospheric pressure instead of vacuum for the molding of hot plastic sheets, can be advantageously employed in the method in accordance with this invention. The choice of the one of these closely related thermoforming techniques which is modified for use as one of the several essential steps of the method of this invention, is determined by the particular compound curved contour which is desired in the decorative, laminated panel in accordance with this invention.

FIGURE 6 illustrates the peripheral shape of the die-cut blank for an embodiment of this decorative laminated panel intended for use as an automobile headliner, before it is molded to give it a domed compound curvature which corresponds to the shape of the top of an automobile. The front 45 of the blank 56 is intended for positioning along the upper edge of the windshield, while its curved rear edge 47 is positioned along the upper edge of the rear window of an automobile.

FIGURE 8 illustrates a fragment of an embodiment of a decorative laminated panel 50 after it has been molded to a compound curvature to render it suitable for use as an automobile headliner as described hereinbefore with reference to FIGURES 4 and 7. After the molding operation, the waffle pattern of score lines is still visible on both surfaces and have not been altered in either depth or width to an extent which is noticeable on visual examination. However, there is alteration in these score lines since they permit the molding of the flat blank into a compound curvature without breaking the laminate, by providing for the expansion or contraction of the laminate during the molding operation. Attempts to mold a laminate which has not been scored in at least those areas in which a material curvature is imposed on the sheet, has resulted in the rupture, or partial rupture, of the laminate in the more sharply curved areas, and in a generally unsightly appearance.

FIGURES 9 and 10 diagrammatically illustrate the position of the decorative laminated panel 50 of this invention in position as a headliner directly beneath the top 51 of an automobile, with its decorated surface facing downwardly. In these figures, the thickness of the parts shown are exaggerated for the purpose of clarity. Referring specifically to FIGURE 9, showing a cross-section of the top of an automobile taken across its length, it will be seen that the side edges of the panel are held in "J" channels 52 and 53 along the inner edges of the top 51 of the automobile, and a sheet 54 of felt or other resilient material is positioned between the headliner and the metal top 51. This sheet 54 of resilient material is for the purpose of damming any tendency of the metal top to vibrate and cause a drumming noise and of providing thermal insulation.

Referring specifically to FIGURE 10, which shows a cross-section of the top of an automobile taken along its length, it will be seen that the front edge of the headliner is held in position by a retaining assembly which also holds the upper edge of the windshield 55. This assembly comprises a header bar 56, an outer molding strip 57, an inner molding strip 58 and a sealing material 59. The molding strip 60 holds the rear edge of the headliner 50, as well as the rearwardly edge of the metal top and the upper edge of the rear window in position.

The retaining assemblies illustrated by FIGURES 9 and 10 are illustrative of those used by the automobile industry for retaining a headliner and associated parts in their relative positions in an automobile, and do not form a part of this invention. It will be understood, however, that the decorative laminated panel in accordance with this invention is suitable for use as a headliner for an automobile in conjunction with any of the various retaining assemblies used by the industry.

To place the headliner in position as illustrated by FIGURES 9 and 10, its normal curvature is reversed and its edges placed directly above and adjacent the channels 52 and 53 along the inner sides of the top of the automobile, after the sheet 54 of resilient material has been glued to the lower side of the top 51. The curvature of the headliner is then reversed to give its lower decorated surface its normal concave curvature. This causes the edges of the headliner to slide into the channels 52 and 53 as the headliner snaps into position. Its installation is then completed by installing the retaining assemblies along the top of the windshield and of the rear window.

The characteristic of this headliner of returning to its original compound curvature, after the curvature has been reversed as described in the foregoing, is an important feature of this headliner and of other embodiments of this decorative laminated panel. This characteristic is believed to be due to the unique physical characteristics of its foamed core. The molding of the laminate while its core is moist with a volatile solvent for the foamed core and the evaporation of the solvent while the laminate is retained in the desired compound curvature, gives the foamed core a permanently set curvature to which the core returns when flexed therefrom, due its elastic memory of the curved shape.

In the foregoing, a number of alternative forms of the decorative, laminated panels in accordance with this invention have been described, together with various ways in which they can be produced. It will be obvious to those skilled in this art that many variations and modifications can be made in the details set forth, without departing from the spirit of this invention or the scope of the claims which follow.

We claim:
1. A method for making a laminated panel having a compound curvature, comprising:
producing a laminate comprising a sheet of foamed plastic material disposed between and adhered to two layers of sheet material,
forming two sets of parallel, approximately equidistantly spaced-apart, creases in each surface of said laminate, with each set of creases on one surface offset by approximately one-half of the distance between them from those on the other surface,
softening said foamed plastic material sufficiently to permit reorientation of its cellular structure without collapse when said laminate is formed into a configuration having a compound curvature,
forming said laminate into a configuration having a compound curvature while said foamed plastic material is sufficiently softened to permit reorientation of its cellular structure, and
hardening said foamed plastic material while said laminate is in said configuration so as to effect retention of said configuration by said laminate.

2. A method according to claim 1, wherein said two sets of parallel creases in each surface of said laminate are positioned at approximately right angles to each other.

3. A method according to claim 1,
wherein said foamed plastic material is a thermoplastic material,
wherein said softening step includes heating said foamed thermoplastic material to a temperature sufficient to permit a reorientation of its cellular structure without collapse when said laminate is formed into a configuration having a compound curvature, and
wherein said hardening step includes cooling said foamed thermoplastic material while said laminate is in said configuration sufficiently to fix its cellular structure in its reoriented condition.

4. A method according to claim 1,
wherein at least one of said two layers of sheet material is permeable by an organic solvent,
wherein said softening step includes
wetting portions of the surface of said permeable sheet in the areas in which said laminate is to be curved with a volatile organic solvent for said foamed plastic material, and
permitting said organic solvent to penetrate said permeable sheet, to wet adjacent portions of said foamed plastic material, and to evaporate from said permeable sheet so as to substantially completely free the surface of said permeable sheet from said organic solvent, and
wherein said forming step is performed while said foamed plastic material is still wet with said organic solvent.

5. A method according to claim 4, including the step of removing residual organic solvent from said laminate after it is formed into said configuration having a compound curvature and while it still retains such compound curvature.

6. A method according to claim 4, wherein said volatile organic solvent has dissolved therein a film-forming material for which it is also a solvent, said film-forming material being present in an amount which causes the resulting solution to have a viscosity within the sprayable range of viscosities.

7. A method according to claim 4, wherein said permeable sheet is subjected to heat to increase its temperature to a point above normal room temperature, but not in excess of the boiling point of said organic solvent, and including the step of circulating air over said permeable sheet to remove the residual organic solvent from said laminate while it retains said configuration having a compound curvature.

8. A method according to claim 4, wherein said organic solvent comprises 1,1,1-trichloroethane.

9. A method according to claim 4, wherein said foamed plastic material comprises polystyrene, and wherein said organic solvent comprises 1,1,1-trichloroethane which has dissolved therein polystyrene in an amount which causes the resulting solution to have a viscosity within the sprayable range of viscosities.

References Cited

UNITED STATES PATENTS

| | | | |
|---|---|---|---|
| 2,510,908 | 3/1947 | Schubert et al. | 260—30.6 |
| 2,614,953 | 2/1946 | Anglada | 156—323 |
| 2,770,406 | 11/1956 | Lane | 161—250 XR |
| 2,978,376 | 1/1957 | Hulse | 260—92 |
| 3,042,562 | 7/1962 | Peterson | 156—257 |
| 3,044,899 | 7/1962 | Canterino | |

OTHER REFERENCES

Delmonte: Technology of Adhesives, Reinhold, (1947), pp. 401–405 relied on.

Teach & Kiessling: Polystyrene, Reinhold (1960), p. 138 relied on.

HAROLD ANSHER, Primary Examiner

W. E. HOAG, Assistant Examiner

U.S. Cl. X.R.

156—257